United States Patent [19]

Ruppert

[11] Patent Number: 5,048,337
[45] Date of Patent: Sep. 17, 1991

[54] HYPSOMETER HAVING CONTROLLED HEATING, PARTICULARLY FOR USE IN METROLOGICAL RADIO-SONDES

[75] Inventor: Paul W. Ruppert, Wetzikon, Switzerland

[73] Assignee: Meteolabor AG, Wetzikon, Switzerland

[21] Appl. No.: 534,427

[22] Filed: Jun. 7, 1990

[30] Foreign Application Priority Data

Nov. 6, 1989 [DE] Fed. Rep. of Germany ....... 3936839

[51] Int. Cl.⁵ .............................................. G01L 9/00
[52] U.S. Cl. .................................................... 73/384
[58] Field of Search ............................. 73/384, 170 R

[56] References Cited

U.S. PATENT DOCUMENTS 2,832,219  4/1958  Sapoff et al. ........................... 73/384
4,388,829  6/1983  Dauphinee ............................. 73/384

Primary Examiner—Donald O. Woodiel
Attorney, Agent, or Firm—Tarolli, Sundheim & Covell

[57] ABSTRACT

The hypsometer comprises an open boiling vessel consisting of a vessel flask containing the measuring fluid and of a vessel neck attached to said vessel. An electrical heating resistor plunges into said measuring fluid. A temperature sensor measures the boiling temperature of said measuring fluid. The hypsometer comprises an adaptive control system for stabilizing the position of condensation zone in the vessel neck which adjusts the heating capacity to a command value corresponding to the specific boiling temperature involved. In the simplest case, such control is realized by using, as heating resistor, a thermistor having a negative temperature coefficient. In this way, the heating capacity is adjusted, over the whole pressure range, to the specific needs. Thus, on the average, less heating capacity is needed, resulting in a considerable reduction of the battery weight.

7 Claims, 1 Drawing Sheet

HYPSOMETER HAVING CONTROLLED HEATING, PARTICULARLY FOR USE IN METROLOGICAL RADIO-SONDES

FIELD OF THE INVENTION

This invention refers to a hypsometer having controlled heating, particularly for use in metrological radio-sondes.

BACKGROUND OF THE INVENTION

By definition, a hypsometer is a boiling point barometer by which the atmospheric pressure can be determined by way of the relation between the saturation vapour pressure and the boiling temperature. Thereby, the boiling temperature changes logarithmically with the pressure. This has the advantage that in applications which have a wide pressure span, the relative pressure measuring accuracy of the boiling temperature. Metrological radio-sondes, while rising to a height of 35 km, traverse a pressure range of 1000 hPa to 5 hPa. Therefore, the hypsometers are more qualified than the aneroidal barometers generally used. A further essential advantage of the hypsometer as compared with the aneroidal barometer is that the former does not need an individual calibration, since the relation of pressure to boiling temperature is known with sufficient accuracy. Sondes which do not need calibration can be reused without more ado after they are located. This is reasonable for ecological reasons too. Therefore, it was proposed already some decades ago to equip radio-sondes with hypsometers.

Heated hypsometers use a fluid, e.g. water, the boiling temperature of which is higher than the ambient temperature. The heating capacity must not be high, since it is to be produced by batteries which are flying along with the sonde. Thus, a small quantity of fluid is to be aimed at. In order to achieve a sufficiently long service life with such a small quantity of fluid, it is to be avoided that during operation of the hypsometer any fluid is lost by condensation of the vapour outside the boiling vessel. On the other hand, the heating capacity is to be constantly high enough for maintaining boiling over the entire pressure range. In order to satisfy these requests, a suitable control of the heating capacity is to be provided for.

In a known hypsometer of this kind (cf. Lueger, Lexikon der Technik, 4th Edition, Stuttgart 1968, Volume 13, Page 456), a control of the heating capacity is provided by means of a thermostat having its temperature measuring point within the vapour expansion space. However, this control is only operative in that narrow range of the boiling temperature where, near the temperature measuring point of the thermostat, it can be operated at a constant command temperature. As soon as the boiling temperature is above or below said range, the temperature at the measuring point drops out of the control range of the thermostat, the heating capacity thus always remaining fully switched-on upon further lowering the boiling temperature, and remaining fully switched-off upon further raising the boiling temperature. However, in these phases an ordinary working of the hypsometer is no longer ensured, since the said marginal conditions are no longer met. Therefore, this hypsometer may be suitable for a stationary operation but is not suitable for metrological radio-sondes in which, during their flight, the boiling temperature may change from 100°C. to a few degrees centigrade.

The heating capacity which is necessary for boiling decreases as the altitude increases, since on the one hand the atmospheric pressure, and therewith the boiling temperature, decrease, and on the other hand the thermal conductivity of the air, and therewith the heat loss, decrease when the atmospheric pressure decreases. Even under these conditions, the hypsometer works properly if the great heating capacity, which is necessary for the pressure on the ground, is continously supplied to it. The reason for this tolerance of the instrument is the great evaporation heat of water. However, a continuous supply of too much heating capacity is unwanted, not only for the risk of excessive loss of fluid, but also for reasons of supply. In radio-sonde applications, beside the costs, the weight of unnecessary large batteries is disturbing.

SUMMARY OF THE INVENTION

An object of the present invention is to eliminate the disadvantages of the prior art described above, and to provide a control for the heating capacity which allows stabilizing the position of the condensation zone within the neck of the vessel for the whole pressure range, and at the same time, to adjust the heating capacity to the specific needs.

In order to accomplish this object in a hypsometer of the kind described above, the present invention provides an adaptive control system which adjusts the heating capacity to a command value corresponding to the specific boiling temperature involved.

A practical embodiment having such indirect adaptive control system preferably comprises means for measuring the decrease of temperature in the neck of the vessel, which means are arranged alongside a measuring section located at the lower end of said neck of the vessel, thereby using a predetermined temperature difference as the command value for adjusting the heating capacity. This temperature difference strongly varies, depending on whether the condensation zone of the vapour is located below, within, or above said measuring section. The position of said condensation zone is defined by the amount of vapour produced by unit of time, i.e. by the amount of heating capacity. The temperature difference, as measured over the measuring section, is practically zero. Therefore, the control system preferably operates with a small command value of temperature difference, e.g. 1°C. This ensures that the condensation zone is positioned closely above the measuring section, independently of the specific boiling temperature. It also ensures that over the whole pressure range the fluid is with certainty boiling, and that the vapour is always condensing within the boiling vessel. At the same time, this solution allows adjusting the heating capacity in the best possible way to the specific needs.

Since, as far as measurement techniques are concerned, no exact control of the heating capacity is necessary, provided that the marginal conditions, i.e. maintenance of boiling and avoidance of any loss of fluid, are observed, a simpler solution is to provide a direct adaptive control system comprising a thermistor having a negative temperature coefficient (NTC) as the heating resistor. If, in air, such a thermistor is connected to a supply point, it increasingly gets warmer up to its destruction. Therefore, it is absolutely uncommon to use NTC-resistors as heating resistors. In a boiling fluid, a NTC-resistor behaves differently. If too much heating capacity is supplied to the NTC-resistor, it cannot be heated beyond the boiling temperature, since the surplus power is used for evaporating the fluid. If the boiling temperature is lowered, for a decreasing atmospheric pressure, the value of resistance of said thermistor is increased, due to its negative temperature coefficient of e.g. about 4 %/°C. Thus, the heating capacity supplied by a constant battery voltage is reduced. With that, by virtue of the resistance/temperature characteristic, the heating capacity depends on the boiling temperature.

Preferably, the characteristic of the thermistor and the heating capacity, defined by the value of resistance of said thermistor and the battery voltage, are chosen so as to supply the hypsometer over the whole pressure range with a heating capacity which is by a safety margin higher than that necessary for boiling. With that, a safe boiling of the fluid is ensured in each state of operation, despite of some dispersions between various specimens of the hypsometer which may occur.

The abovementioned solution of a direct adaptive control system, in which the heating element is self-regulating its heating capacity under the controlling influence of the boiling temperature, shows the advantage that no supplemental expenditure is to be made, except for the replacement of a constant heating resistor by an NTC-resistor. In particular, the means necessary in the firstmentioned solution for measuring the temperature difference and said separate heating controller can be omitted. Despite of the fact that a hypsometer having a NTC-resistor is of an essentially simpler construction, it allows to reduce the battery weight by at least one half.

PREFERRED EMBODIMENTS OF THE INVENTION

Figure 1:
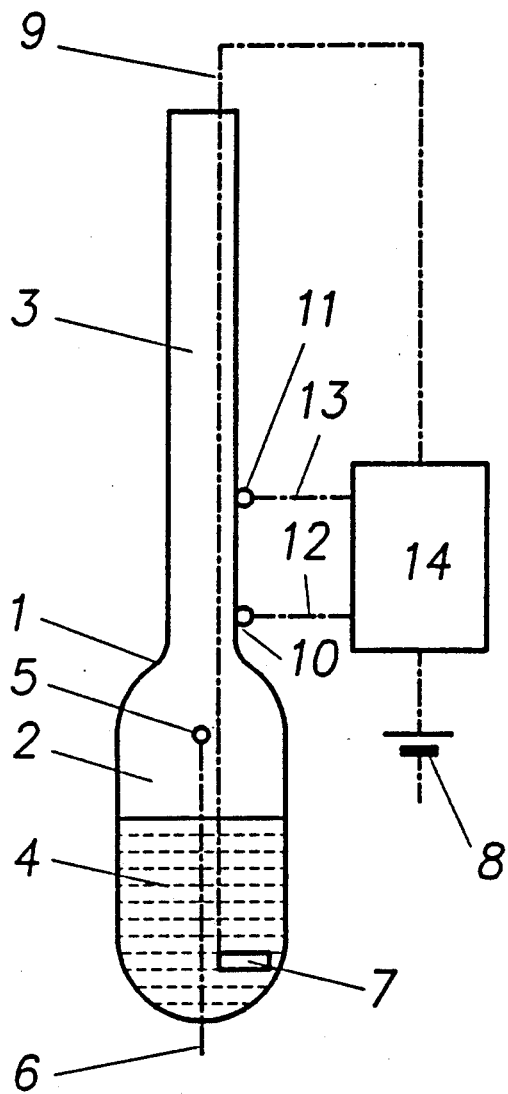
FIG. 1 shows a hypsometer according to the present invention comprising a heating capacity regulation operating on the basis of a temperature difference measurement.

Now, two preferred embodiment of the present invention will be described with reference to the drawings.

In both embodiments, the hypsometer comprises a boiling vessel 1, e.g. made from glass, said boiling vessel comprising a vessel flask 2 and attached thereto a vessel neck 3 which is open at its top. The vessel flask 2 contains the measuring fluid 4, e.g. water on methanol, and a temperature sensor 5, preferably a thermoelectric cell, which measures the boiling temperature in the vapour space above the level of the fluid, and which is connected to the exterior by a lead-off line 6.

In the embodiment shown in FIG. 1, said vessel flask 2 further comprises a heating resistor 7 of usual kind, plunging into the measuring fluid 4 to which heating energy is supplied from a battery 8 trough a feed line 9. Located directly above said vessel flask 2, there are two measuring points for measuring the decrease of temperature in the region of the vessel neck 3 deliminated by said measuring points. At each of said measuring points, is disposed a temperature sensor 10 and 11, respectively, which is connected to a heating controller 14 by signal lines 12 and 13, respectively. Said heating controller 14 controls the heating capacity supplied to the heating resistor 7 so as to keep the temperature difference between said two measuring points at a predetermined command value, e.g. 1° C.

Figure 2:
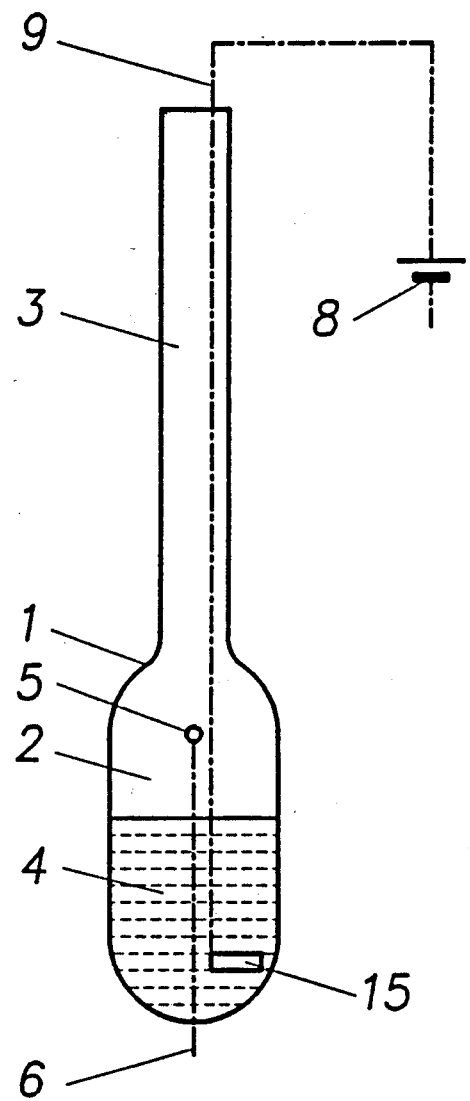
FIG. 2 shows a hypsometer according to the present invention comprising a NTC-resistor as the heating resistor.

In the embodiment shown in FIG. 2 the common heating resistor (i.e. 7 in FIG. 1) is replaced by a thermistor 15 having a negative temperature coefficient which is directly fed from the battery 8 by the feed line 9. The control system, comprising elements 10 to 14 in the embodiment of FIG. 1, is omitted in the embodiment of FIG. 2.

What is claimed is:

1. A hypsometer having controlled heating, particularly for use in metrological radio-sondes, comprising:
   an open boiling vessel including a vessel flask containing measuring fluid, and a vessel neck attached to said vessel flask;
   an electrical heating resistor plunging into the measuring fluid and located within said vessel flask, said heating resistor being a thermistor having a negative temperature coefficient;
   a temperature sensor measuring the boiling temperature; and
   an adaptive control system adjusting the heating capacity to a command value corresponding to the specific boiling temperature involved.

2. A hypsometer according to claim 1, wherein the measuring fluid is water.

3. A hypsometer according to claim 1, wherein the measuring fluid is methanol.

4. A hypsometer according to claim 1, wherein the characteristic of the thermistor and the heating capacity, defined by the value of resistance of said thermistor and the battery voltage, are chosen so as to supply the hypsometer over the whole pressure range with a heating capacity which is by a safety margin higher than that necessary for boiling.

5. A hypsometer having controlled heating, particularly for use in metrological radio-sondes, comprising:
   an open boiling vessel including a vessel flask containing measuring fluid, and a vessel neck attached to said vessel flask;
   an electrical heating resistor plunging into the measuring fluid and located within said vessel flask;
   a temperature sensor measuring the boiling temperature; and
   an adaptive control system adjusting the heating capacity to a command value corresponding to the specific boiling temperature involved;
   said adaptive control system comprising means for measuring the decrease of temperature in said vessel neck, said measuring means being arranged alongside a measuring section located at the lower end of said vessel neck, thereby using a predetermined temperature difference as said command value for adjusting the heating capacity, said command value of said temperature difference being about 1 degree C. in order to hold the condensation zone in a stable position closely above said measuring section, independtly of the specific boiling temperature.

6. A hypsometer according to claim 5, wherein the measuring fluid is water.

7. A hypsometer according to claim 5, wherein the measuring fluid is methanol.

* * * * *

UNITED STATES PATENT AND TRADEMARK OFFICE
CERTIFICATE OF CORRECTION

PATENT NO. : 5,048,337

DATED : September 17, 1991

INVENTOR(S) : Paul W. Ruppert

It is certified that error appears in the above-identified patent and that said Letters Patent is hereby corrected as shown below:

Column 4, line 62, claim 5, delete "independtly"
and insert --independently--.

Signed and Sealed this

Second Day of March, 1993

Attest:

STEPHEN G. KUNIN

*Attesting Officer*  *Acting Commissioner of Patents and Trademarks*